US012005700B2

(12) United States Patent
Balthasar et al.

(10) Patent No.: US 12,005,700 B2
(45) Date of Patent: Jun. 11, 2024

(54) AIRFLOW CONTROL VIA SELF-CLOSING HOLES IN MOVABLE SUPPORT SURFACE OF A PRINTING SYSTEM, AND RELATED DEVICES, SYSTEMS, AND METHODS

(71) Applicant: XEROX CORPORATION, Norwalk, CT (US)

(72) Inventors: Brian M. Balthasar, North Tonawanda, NY (US); John Patrick Baker, Rochester, NY (US); Emmett James Spence, Honeoye Falls, NY (US); Robert Jian Zhang, Brighton, NY (US); Megan Zielenski, Holland Patent, NY (US)

(73) Assignee: XEROX CORPORATION, Norwalk, CT (US)

( * ) Notice: Subject to any disclaimer, the term of this patent is extended or adjusted under 35 U.S.C. 154(b) by 89 days.

(21) Appl. No.: 17/218,925

(22) Filed: Mar. 31, 2021

(65) Prior Publication Data

US 2022/0314655 A1 Oct. 6, 2022

(51) Int. Cl.
*B41J 11/00* (2006.01)

(52) U.S. Cl.
CPC .......... *B41J 11/0085* (2013.01); *B41J 11/007* (2013.01)

(58) Field of Classification Search
CPC ....... B41J 11/0085; B41J 11/007; B41J 11/00; B41J 29/393; B65H 2406/31;
(Continued)

(56) References Cited

U.S. PATENT DOCUMENTS 8,388,246 B2 3/2013 Spence et al.
9,944,094 B1 4/2018 Herrmann et al.
(Continued)

FOREIGN PATENT DOCUMENTS

CN 112824284 A * 5/2021 ........... B25B 11/005
EP 1 319 510 B1 9/2009
GB 2 374 834 A 10/2002

OTHER PUBLICATIONS

Barberan Latorre, J F; Vacuum System For Fixing Substrate; May 21, 2021; China, All (Year: 2021).*
(Continued)

*Primary Examiner* — Justin Seo
*Assistant Examiner* — Tracey M McMillion
(74) *Attorney, Agent, or Firm* — Jones Robb, PLLC

(57) ABSTRACT

A printing system comprises an ink deposition assembly and a media transport assembly. The ink deposition assembly comprises a printhead arranged to eject a print fluid to a deposition region of the ink deposition assembly. The media transport assembly comprises a vacuum source and a movable support surface. The movable support surface comprises valves having holes through the media support surface. The media transport assembly is configured to hold one or more print media against the movable support surface by vacuum suction communicated from the vacuum source through valves. The valves are each configured to transition between a closed state in which airflow through the hole of the respective valve is prevented and an open state in which airflow through the hole of the respective valve is allowed.

20 Claims, 8 Drawing Sheets

(58) Field of Classification Search
CPC ...... B65H 2406/362; B65H 2406/3622; B65H 2406/41; B65H 2801/06; B65H 5/224
See application file for complete search history.

(56) References Cited

U.S. PATENT DOCUMENTS

| | | | | |
|---|---|---|---|---|
| 10,688,778 | B2 | 6/2020 | Fromm et al. | |
| 2001/0046404 | A1* | 11/2001 | Wotton | B65H 5/224 400/578 |

OTHER PUBLICATIONS

Barberan Latorre, J F; Vacuum System For Fixing Substrate, May 21, 2021, China, All Pages (Year: 2021).*
Takahashi, Masahiro, Sheet Material Carrying Device, Aug. 19, 1997, Japan, All Pages (Year: 1997).*
Barbaren, Latorre, J F, Vacuum System For Fixing Substrate, May 21, 2021, China, All Pages (Year: 2021).*

* cited by examiner

AIRFLOW CONTROL VIA SELF-CLOSING HOLES IN MOVABLE SUPPORT SURFACE OF A PRINTING SYSTEM, AND RELATED DEVICES, SYSTEMS, AND METHODS

FIELD

Aspects of this disclosure relate generally to inkjet printing, and more specifically to inkjet printing systems having a media transport assembly utilizing vacuum suction to hold and transport print media. Related devices, systems, and methods also are disclosed.

INTRODUCTION

In some applications, inkjet printing systems use an ink deposition assembly with one or more printheads, and a media transport assembly to move print media (e.g., a substrate such as sheets of paper, envelopes, or other substrate suitable for being printed with ink) through an ink deposition region of the ink deposition assembly (e.g., a region under the printheads). The inkjet printing system forms printed images on the print media by ejecting ink from the printheads onto the media as the media pass through the deposition region. In some inkjet printing systems, the media transport assembly utilizes vacuum suction to assist in holding the print media against a movable support surface (e.g., conveyor belt, rotating drum, etc.) of the transport device. Vacuum suction to hold the print media against the support surface can be achieved using a vacuum source (e.g., fans) and a vacuum plenum fluidically coupling the vacuum source to a side of the movable support surface opposite from the side that supports the print medium. The vacuum source creates a vacuum state in the vacuum plenum, causing vacuum suction through holes in the movable support surface that are fluidically coupled to the vacuum plenum. When a print medium is introduced onto the movable support surface, the vacuum suction generates suction forces that hold the print medium against the movable support surface. The media transport assembly utilizing vacuum suction may allow print media to be securely held in place without slippage while being transported through the ink deposition region under the ink deposition assembly, thereby helping to ensure correct locating of the print media relative to the printheads and thus more accurate printed images. The vacuum suction may also allow print media to be held flat as it passes through the ink deposition region, which may also help to increase accuracy of printed images, as well as helping to prevent part of the print medium from rising up and striking part of the ink deposition assembly and potentially causing a jam or damage.

One problem that may arise in inkjet printing systems that include media transport assemblies utilizing vacuum suction is unintended blurring of images resulting from air currents induced by the vacuum suction. In some systems, such blurring may occur in portions of the printed image that are near the edges of the print media, particularly those portions that are near the lead edge or trail edge in the transport direction (sometimes referred to as process direction) of the print media. During a print job, the print media are spaced apart from one another on the movable support surface as they are transported through the deposition region of the ink deposition assembly, and therefore parts of the movable support surface between adjacent print media are not covered by any print media. This region between adjacent print media is referred to herein as the inter-media zone. Thus, adjacent to both the lead edge and the trail edge of each print medium in the inter-media zone there are uncovered holes in the movable support surface. Because these holes are uncovered, the vacuum of the vacuum plenum induces air to flow through those uncovered holes. This airflow may deflect ink droplets as they are traveling from a printhead to the substrate, and thus cause blurring of the image.

A need exists to improve the accuracy of the placement of droplets in inkjet printing systems and to reduce the appearance of blur of the final printed media product. A need further exists to address the blurring issues in a reliable manner and while maintaining speeds of printing and transport to provide efficient inkjet printing systems.

SUMMARY

Embodiments of the present disclosure may solve one or more of the above-mentioned problems and/or may demonstrate one or more of the above-mentioned desirable features. Other features and/or advantages may become apparent from the description that follows.

In accordance with at least one embodiment of the present disclosure, a printing system comprises an ink deposition assembly and a media transport assembly. The ink deposition assembly comprises a printhead arranged to eject a print fluid to a deposition region of the ink deposition assembly. The media transport assembly comprises a vacuum source and a movable support surface. The movable support surface comprises valves having holes through the media support surface. The media transport assembly is configured to hold one or more print media against the movable support surface by vacuum suction communicated from the vacuum source through valves. The valves are each configured to transition between a closed state in which airflow through the hole of the respective valve is prevented and an open state in which airflow through the hole of the respective valve is allowed.

In accordance with at least one embodiment of the present disclosure, a movable support surface for a printing system comprises a flexible belt and a plurality of valves arranged in the flexible belt to communicate vacuum suction through the flexible belt to hold print media being transported by the movable support surface against the flexible belt. The valves are configured to transition between an open state in which the vacuum suction is communicated through the respective valve and a closed state in which the vacuum suction is blocked through the respective valve.

In accordance with at least one embodiment of the present disclosure, a method comprises loading a print medium onto a movable support surface of a media transport assembly of a printing system and holding the print medium against the movable support surface via vacuum suction through valves in the movable support surface. The method further comprises causing those of the valves that are covered by the print medium to transition, via interaction of the print medium with the valves, from a closed state in which the vacuum suction is blocked through the respective valves to an open state in which the vacuum suction is permitted through the respective valves. The method further comprises transporting the print medium, via the movable support surface, in a process direction through a deposition region of a printhead of the printing system; and ejecting print fluid from the printhead to deposit the print fluid to the print medium in the deposition region.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more embodiments of the present teachings and together with the description explain certain principles and operation. In the drawings.

DETAILED DESCRIPTION

In the Figures and the description herein, numerical indexes such as "_1", "_2", etc. are appended to the end of the reference numbers of some components. When there are multiple similar components and it is desired to refer to a specific one of those components, the same base reference number is used and different indexes are appended to it to distinguish individual components. However, when the components are being referred to generally or collectively without a need to distinguish between specific ones, the index may be omitted from the base reference number. Thus, as one example, a print medium 5 may be labeled and referred to as a first print medium 5_1 when it is desired to identify a specific one of the print media 5, as in FIG. 1A, but it may also be labeled and referred to as simply a print medium 5 in other cases in which it is not desired to distinguish between multiple print media 5.

Figures 1A, 1B, 1C:
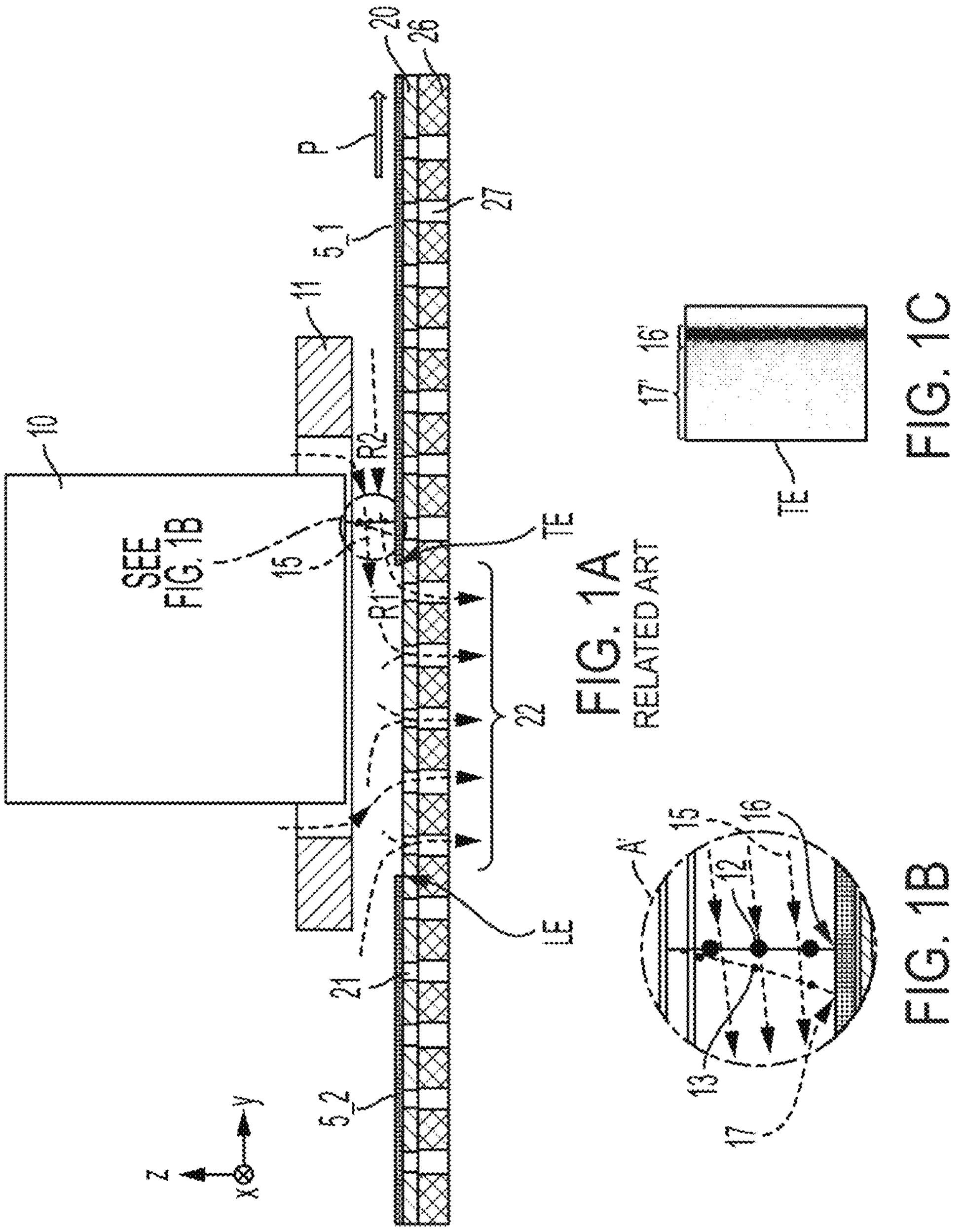
FIG. 1A RELATED ART
FIGS. 1A-1L schematically illustrate air flow patterns relative to a printhead assembly, transport device, and print media during differing stages of print media transport through an ink deposition region of a conventional inkjet printing system, and resulting blur effects in the printed media product.
Figures 1D, 1E, 1F:
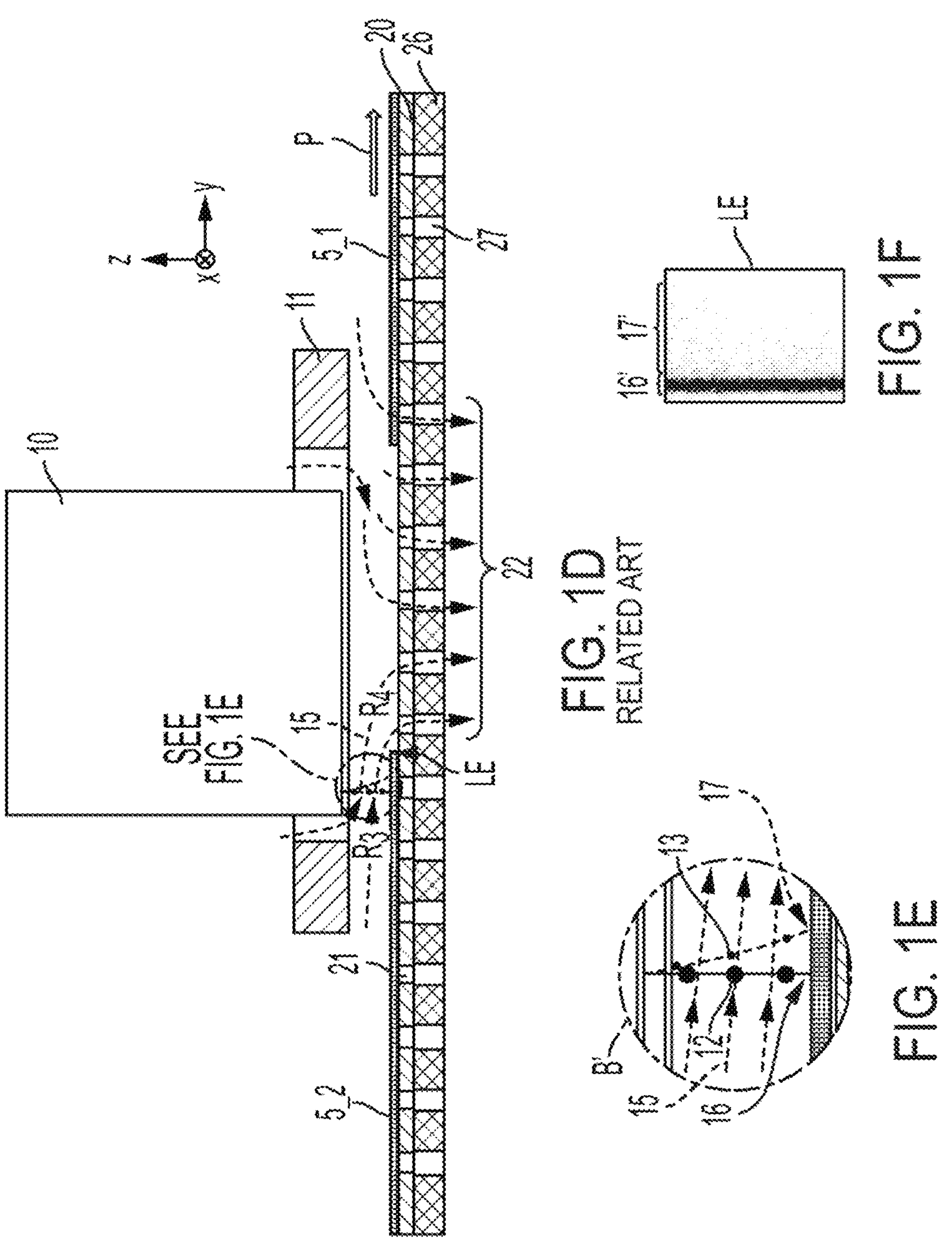
FIG. 1D RELATED ART
Figures 1G, 1H, 1I:
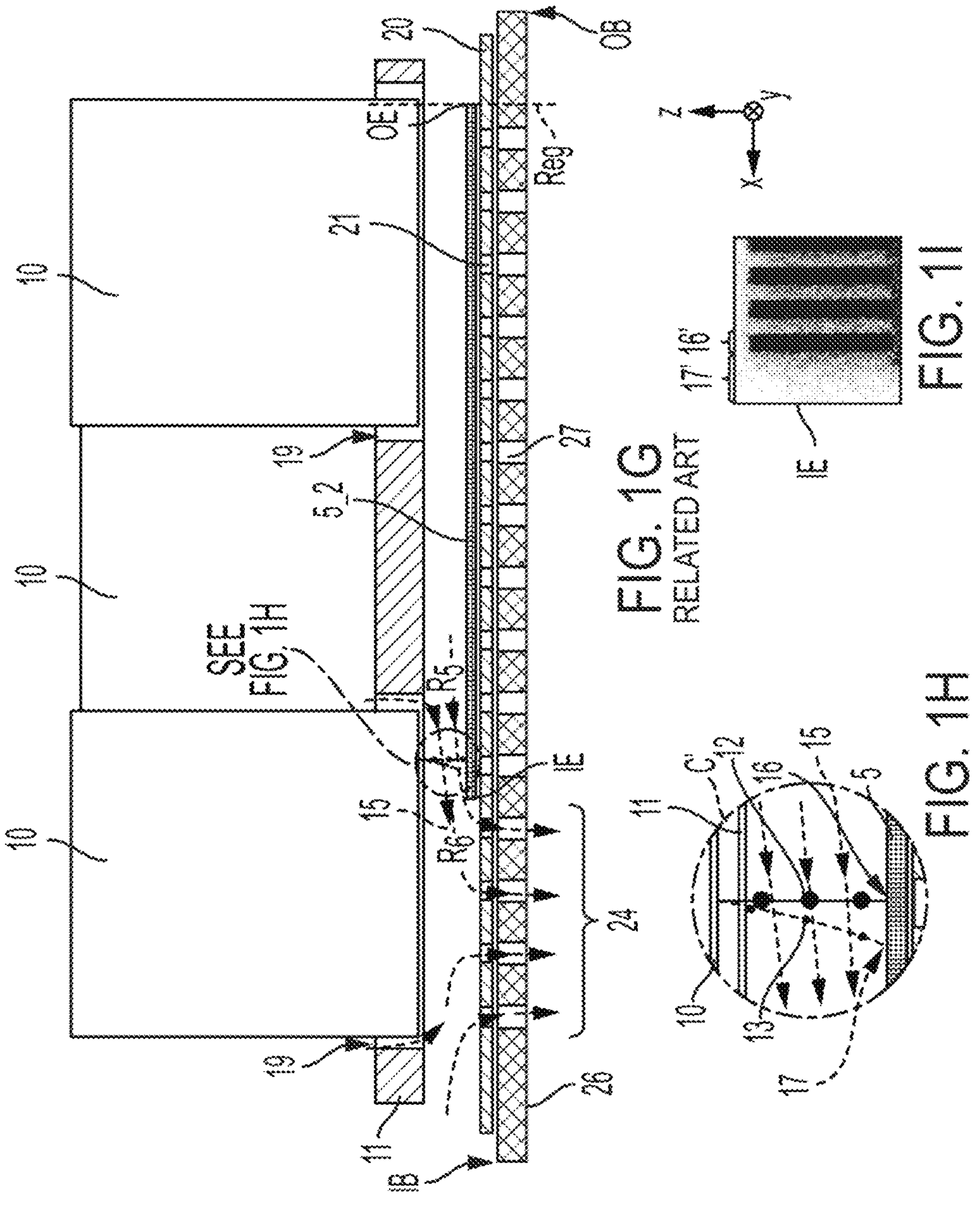
FIG. 1G RELATED ART
Figures 1J, 1K, 1L:
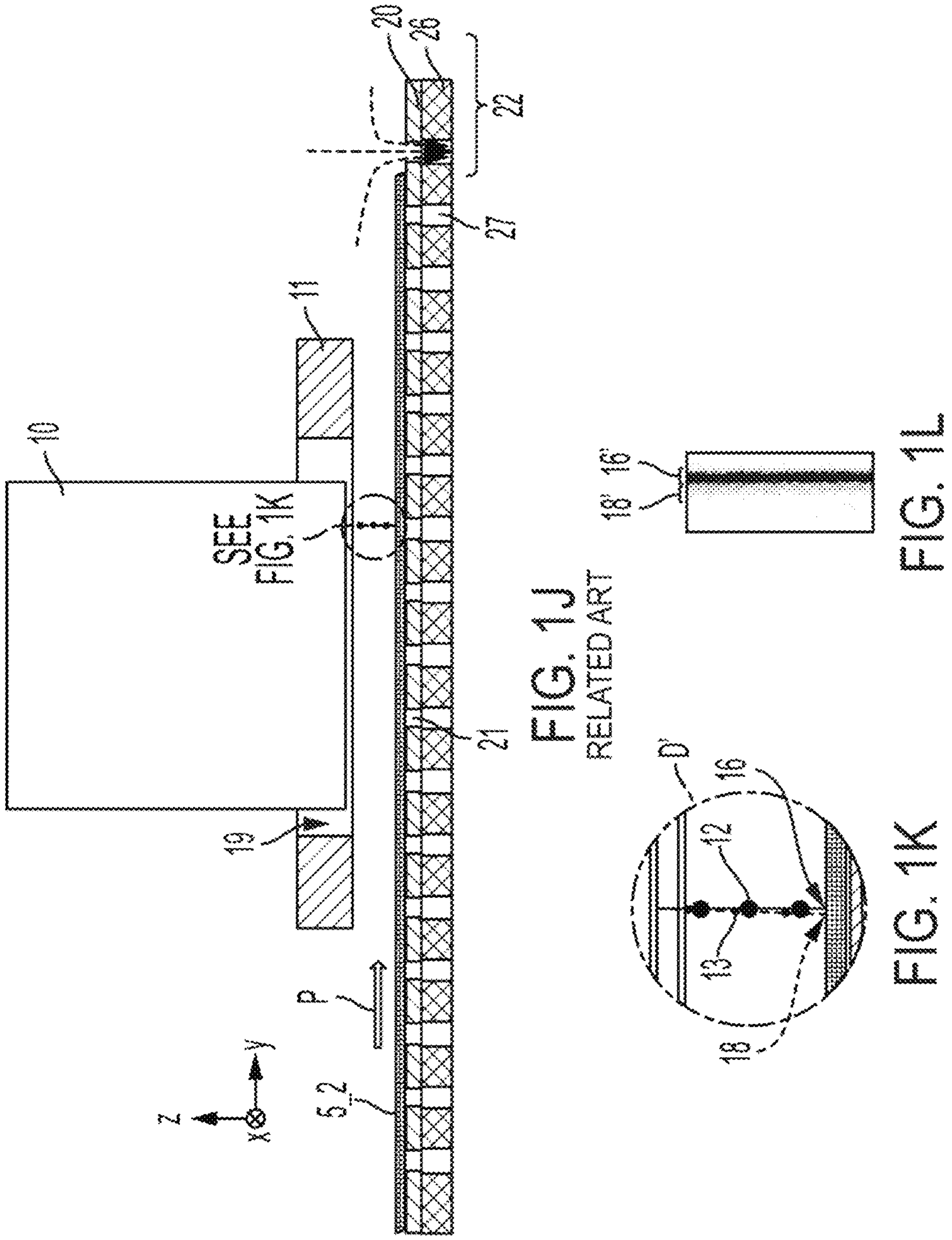
FIG. 1J RELATED ART

As described above, when an inter-media zone is near or under a printhead, the uncovered holes in the inter-media zone can create crossflows that can blow satellite droplets off course and cause image blur. Similarly, uncovered holes along an inboard or outboard side of the print media can also create crossflows that cause image blur. To better illustrate some of the phenomena occurring giving rise to the blurring issues, reference is made to FIGS. 1A-1F. FIGS. 1A, 1D, 1G, and 1J illustrate schematically printheads 10 printing on a print medium 5 near a trail edge TE, a lead edge LE, an inboard edge, and a middle, respectively, of the print medium 5. FIGS. 1A, 1D, and 1J are cross-sections taken through a printhead 10 along a process direction (y-axis direction in the figures), while FIG. 1G is a cross-section taken through the same printhead 10 along a cross-process direction perpendicular to the process direction (x-axis direction in the figures), with the illustration in FIG. 1G depicting an embodiment having three printheads in a series along the x-direction with one being offset from the other two. FIGS. 1B, 1E, 1H, and 1K illustrate enlarged views of the regions A, B, C, and D respectively in FIGS. 1A, AD, 1B, and 1J. FIGS. 1C, 1F, 1I and 1L illustrate enlarged pictures of printed images, the printed images comprising lines printed near the trail edge TE, lead edge LE, inboard edge, and middle, respectively, of a sheet of paper.

As shown in FIGS. 1A, 1D, 1G, and 1J, the inkjet printing system comprises one or more printheads 10 to eject ink to print media 5 through printhead openings 19 in a carrier plate 11. The inkjet printing system also comprises a movable support surface 20 to transport the print media 5 in a process direction P, which corresponds to a positive y-axis direction in the Figures. The movable support surface 20 slides along a top of a vacuum platen 26, and a vacuum environment is provided on a bottom side of the platen 26. The movable support surface 20 has holes 21 and the vacuum platen 26 has platen holes 27. The holes 21 and 27 periodically align as the movable support surface 20 moves thereby exposing the region above the movable support surface 20 to the vacuum below the platen 26. In regions where the print medium 5 covers the holes 21, the vacuum suction through the aligned holes 21 and 27 generates a force that holds the print medium 5 against the movable support surface 20. However, little or no air is drawn into these covered holes 21 and 27 from the environment above the movable support surface 20 since they are blocked by the print medium 5. On the other hand, as shown in FIGS. 1A, 1D, and 1G in the inter-media zone 22 (see FIGS. 1A and 1D) and in the uncovered region 24 near the inboard side IB of the platen 26 (see FIG. 1G), the holes 21 and 27 are not covered by the print media 5, and therefore the vacuum suction pulls air from above the movable support surface 20 to flow down through these holes 21 and 27. This creates airflows, indicated by the dashed arrows in FIGS. 1A, 1D, and 1G which flow from regions around the printhead 10 towards the uncovered holes 21 and 27 in the inter-media zone 22 and the uncovered region 24, with some of the airflows passing under the printhead 10.

In FIG. 1A, the print medium 5_1 is being printed on near its trail edge TE, and therefore the region where ink is currently being ejected ("ink-ejection region") (e.g., region A in FIG. 1A) is located downstream of the inter-media zone 22 (upstream and downstream being defined with respect to the process direction P). Accordingly, some of the air being sucked towards the inter-media zone 22 will flow upstream through the ink-ejection region under the printhead 10. More specifically, the vacuum suction from the inter-media zone 22 lowers the pressure in the region immediately above the inter-media zone 22, e.g., region $R_1$ in FIG. 1A, while the region downstream of the printhead 10, e.g., region $R_2$ in FIG. 1A, remains at a higher pressure. This pressure gradient causes air to flow in an upstream direction from the region $R_2$ to the region $R_1$, with the airflows crossing through a portion of the ink-ejection region (e.g., region A in FIG. 1A) which is between the regions $R_1$ and $R_2$. Airflows such as these, which cross through the ink-ejection region, are referred to herein as crossflows 15. In FIG. 1A, the crossflows 15 flow upstream, but in other situations the crossflows 15 may flow in different directions.

As shown in the enlarged view A' in FIG. 1B, which comprises an enlarged view of the region A in FIG. 1A, as ink is ejected from the printhead 10 towards the medium 5, main droplets 12 and satellite droplets 13 are formed. The satellite droplets 13 are much smaller than the main droplets 12 and have less mass and momentum, and thus the upstream crossflows 15 tend to affect the satellite droplets 13 more than the main droplets 12. Thus, while the main droplets 12 may land on the print medium 5 near their intended deposition location 16 regardless of the crossflows 15, the crossflows 15 may push the satellite droplets 13 away from the intended trajectory so that they land at an unintended location 17 on the medium 5, the unintended location 17 being displaced from the intended location 16. The result of such crossflows and consequent misplaced droplets can be seen in an actual printed image in FIG. 1C, in which a region 16' of denser printed dots corresponding to the intended printed line is formed by droplets (e.g., generally the main droplets 12) which were deposited predominantly at their intended locations, whereas a region 17' of sparser dots dispersed away from the line are formed by droplets (e.g., generally the satellite droplets 13) which were blown away from the intended locations to land in unintended locations. The resulting image has a blurred or smudged appearance for the printed line. Notably, the blurring in FIG. 1C is asymmetrically biased towards the trail edge TE, which would be the expected result of the crossflows 15 near the trail edge TE blowing primarily in an upstream direction. The inter-media zone 22 may also induce other airflows flowing in other directions, such as downstream airflows from an upstream side of the printhead 10, but these other airflows do not pass through the region where ink is currently being ejected in the illustrated scenario and thus do not contribute to image blur. Only those airflows that cross through the ink ejection region are referred to herein as crossflows.

FIGS. 1D-1F schematically illustrate another situation in which such blurring occurs, but this time near the lead edge LE of the print medium 5_2. The cause of blurring near the lead edge LE is similar to that described above in relation to the trail edge TE, except that in the case of printing near the lead edge LE the ink-ejection region is now located upstream of the inter-media zone 22. As a result, the crossflows 15 that are crossing through the ink-ejection region now originate from the upstream side of the printhead 10, e.g., from region R3, and flow downstream to region $R_4$. Thus, as shown in the enlarged view B' of FIG. 1E, which comprises an enlarged view of the region B of FIG. 1D, in the case of printing near the lead edge LE of the print medium 5_2, the satellite droplets 13 are blown downstream towards the lead edge LE of the print medium 5_2 (positive y-axis direction) to land at unintended locations 17, while the main droplets 12 tend to land at or near their intended locations 16. As shown in FIG. 1F, such an effect results in asymmetric blurring that is biased towards the lead edge LE of the print medium (i.e., a denser region 16' of printed dots corresponding to a line is formed with a sparser region 17' of printed dots trailing away from the line toward the lead edge LE).

FIGS. 1G-1*I* illustrate yet another situation in which such blurring can occur, but this time near the inboard edge IE of the print medium 5 due to uncovered holes 21, 27 in that region. The cause of blurring near the inboard edge IE is similar to that described above in relation to the trail edge TE and lead edge LE, except that in the case of printing near the inboard edge IE the ink-ejection region is now located outboard of the uncovered region 24 of the holes 21 and 27 in the movable support surface 20 and platen 26. As a result, the crossflows 15 that are crossing through the ink-ejection region now originate from the outboard side of the printhead 10, e.g., from region $R_5$, and flow in an inboard direction towards the region $R_6$. Thus, as shown in the enlarged view C' of FIG. 1H, which comprises an enlarged view of the region C of FIG. 1G, in the case of printing near the inboard edge IE, the satellite droplets 13 are blown inboard towards the inboard edge IE of the print medium 5 (positive y-axis direction) and land at unintended locations 17 rather than at the intended location 16 where main droplets 12 land. As shown in FIG. 1I, such a crossflow pattern is expected to result in asymmetric blurring that is biased towards the inboard edge IE (i.e., a denser region 16' of printed dots corresponding to a line is formed with a sparser region 17' of printed dots trailing away from the line toward the inboard edge IE).

In contrast, as shown in FIG. 1J and the enlarged view D' in FIG. 1K, which corresponds to an enlarged view of region D of FIG. 1J, when printing farther from the edges (trail, leading, or inboard) of the print medium 105 there may be little or no crossflows 15 because the inter-media zone 22 and the uncovered region 24 are too distant to induce much airflow. Because the crossflows 15 are absent or weak farther away from the edges of the print medium 5, the satellite droplets 13 in this region are not as likely to be blown off course. Thus, as shown in FIGS. 1K and 1L, when printing farther from the edges of the print medium 5, the satellite droplets land at the intended location 16 or at locations 18 that are much closer to the intended locations 16 resulting in much less image blurring. The deposition locations 18 of the satellite droplets may still vary somewhat from the intended locations 16, due to other factors affecting the satellite droplets 13, but the deviation is smaller than it would be near the lead or trail edges. FIG. 1L depicts a resulting image of a situation such as that in FIGS. 1J and 1K, showing the printed line presenting droplets landing at intended locations 16' in which and some droplets landing sufficiently close to the intended locations 16' at locations 18'. The resulting image does not show a significantly noticeable blurring or smudged appearance of the line.

Embodiments disclosed herein may, among other things, inhibit some of the crossflows so as to reduce the resulting image blur that may occur. By inhibiting crossflows, the droplets ejected from a printhead (including, e.g., the satellite droplets) are more likely to land closer to or at their intended deposition locations, and therefore the amount of blur can be reduced. In accordance with various embodiments, an airflow control system comprises a number of valves arranged in the movable support surface, with each valve forming a closable hole or passageway that communicates the vacuum suction through the movable support surface. Each valve is arranged to close and open the corresponding hole based on whether a print medium is located above the valve. The valve is biased to close the hole when it is not covered by a print medium, and conversely to open the hole when it is covered by a print medium. For example, in some embodiments the valve may each comprise a biased closure mechanism (e.g., a flexible reed) which is movable between an open position in which it does not block airflow through the hole and a closed position in which it does block airflow through the hole. The valve is configured to bias the closure mechanism towards the closed position (e.g., by vacuum suction and/or spring forces internal to the closure mechanism), such that when a print medium is not located above the valve the closure mechanism is moved by the biasing to the closed position. The valve is further configured such that, when a print medium is above the valve, the closure mechanism is held in the open position by interaction with the print medium. In particular, vacuum suction through the hole pulls the print medium downward against the reed, pressing the reed towards the open position and overcoming the biasing force that urges the reed to the closed position. In this manner, the movable support surface is configured to automatically prevent suction through any uncovered holes by virtue of the valves, which are passively actuated to the desired state without requiring active control or powered actuators (e.g., by the biasing elements and by interaction with the vacuum suction and print media). With suction through the uncovered holes being prevented, the crossflows that would have been induced by such uncovered holes are reduced or eliminated. With the crossflows near the trail edge, lead edge, and/or or lateral edges (outboard and/or inboard edges) of the print media reduced or eliminated, the ink droplets (including the satellite droplets) are more likely to land at or nearer to their intended deposition locations, and therefore the amount of blur near that edge of the print media is reduced.

Figure 2:
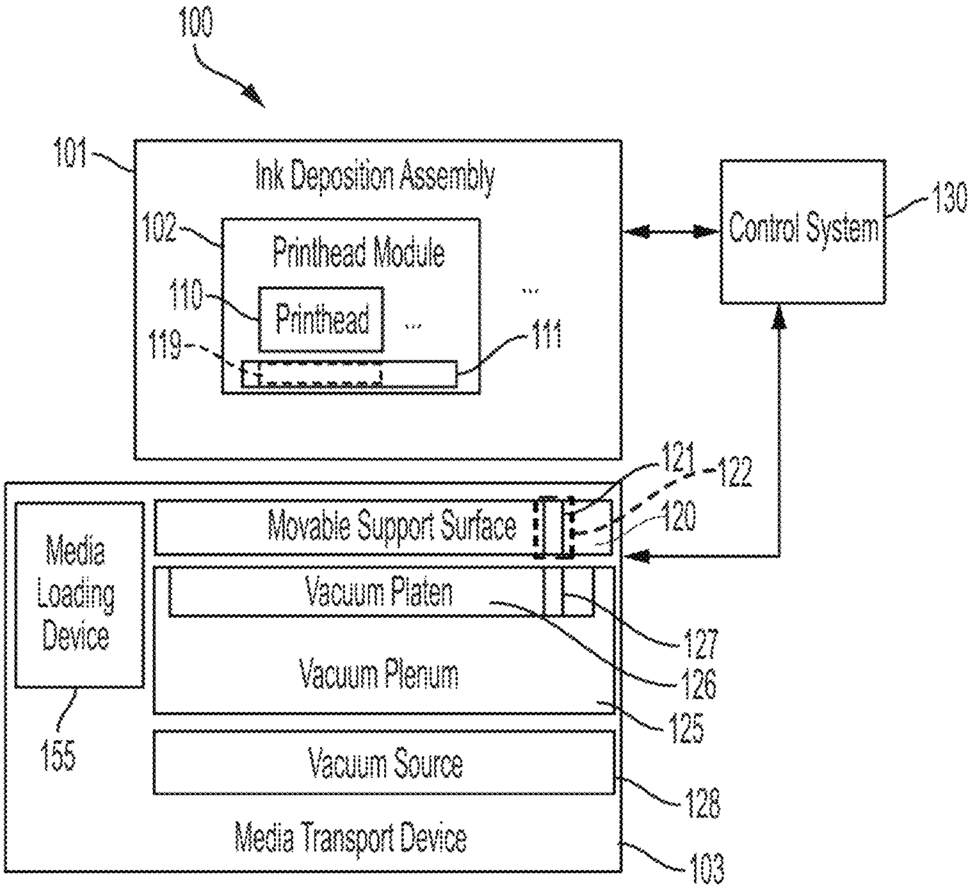
FIG. 2 comprises is a block diagram illustrating components of an embodiment of an inkjet printing system including an air flow control system.

Turning now to FIG. 2, an embodiment of a printing system will be described in greater detail. FIG. 2 is a block diagram schematically illustrating a printing system 100 utilizing the above-described airflow control system. The printing system 100 comprises an ink deposition assembly 101 to deposit ink on print media, a media transport assembly 103 to transport print media through the ink deposition assembly 101, and a control system 130 to control operations of the printing system 100.

The ink deposition assembly 101 comprises one or more printhead modules 102. One printhead module 102 is illustrated in FIG. 2 for simplicity, but any number of printhead modules 102 may be included in the ink deposition assembly 101. In some embodiments, each printhead module 102 may correspond to a specific ink color, such as cyan, magenta, yellow, and black. Each printhead module 102 comprises one or more printheads 110 configured to eject print fluid, such as ink, onto the print media to form an image. In FIG. 2, one printhead 110 is illustrated in the printhead module 102 for simplicity, but any number of printheads 110 may be included per printhead module 102. The printhead modules 102 may comprise one or more walls, including a bottom wall which may be referred to herein as a carrier plate 111. The carrier plate 111 comprises printhead openings 119, and the printheads 110 are arranged to eject their ink through the printhead openings 119. In some embodiments, the carrier plate 111 supports the printheads 110. In other embodiments, the printheads 110 are supported by other structures. The printhead modules 102 may also include additional structures and devices to support and facilitate operation of the printheads 110, such as, ink supply lines, ink reservoirs, electrical connections, and so on, as known in the art.

As shown in FIG. 2, the media transport assembly 103 comprises a movable support surface 120, a vacuum plenum 125, a vacuum source 128, and a media loading/registration device 155. The movable support surface 120 transports the print media through a deposition region of the ink deposition assembly 101. The vacuum plenum 125 supplies vacuum suction from the vacuum source 128 to one side of the movable support surface 120 (e.g., a bottom side), and print media is supported on an opposite side of the movable support surface 120 (e.g., a top side). Valves 122 in the movable support surface 120 comprise holes 121, which can communicate the vacuum suction through the surface 120 when the corresponding valve is in an open state. The vacuum suction communicated through the holes 121 can hold down the print media against the surface 120. The media loading/registration device 155 loads the print media onto the movable support surface 120 and registers the print media relative to various registration datums.

The movable support surface 120 is movable relative to the ink deposition assembly 101, and thus the print media held against the movable support surface 120 is transported relative to the ink deposition assembly 101 as the movable support surface 120 moves. Specifically, the movable support surface 120 transports the print media through a deposition region of the ink deposition assembly 101, the deposition region being a region in which print fluid (e.g., ink) is ejected onto the print media, such as a region under the printhead(s) 110. The movable support surface 120 can comprise any structure capable of being driven to move relative to the ink deposition assembly 101 and which has holes 121 to allow the vacuum suction to hold down the print media, such as a belt, a drum, etc.

As noted above, the movable support surface comprises valves 122, and each valve 122 comprises a hole 121. The hole 121 comprises a passageway through the movable support surface 120, which can fluidically couple the region below the movable support surface 120 to the region above the moveable support surface 120. The holes 121 are openable and closable through closure mechanisms of the corresponding valves 122. The valves 122 are configured to transition between the open state and the closed state based on whether they are covered by a print medium. In the open state of a valve 122, the vacuum suction is communicated through the associated hole 121 to the region above the movable support surface, while in the closed state of the valves, airflow through the hole 121 is blocked and the vacuum suction is not communicated through the hole 121 to the region above the movable support surface. Each valve 122 is biased to the closed state when the hole 121 is not covered by a print medium. On the other hand, when a print medium is located over the hole 121, the associated valve 122 is held in an open state, in which airflow through the holes 121 is allowed (and hence the vacuum suction from the plenum 125 is communicated through the hole 121). The valve 122 located under a print medium is held in the open state by interaction with the print media. In some embodiments, all of the valves 122 are initialized into the open state by an externally applied force, for example via contact with a print medium disposed above the valve 122 and/or contact with a roller (described further below with respect to an embodiment of FIG. 3), and then those of the valves 122 that are covered by a print medium are retained in the open state by interaction with the print medium located above the valve 122 while those of the valves 122 that are not covered by a print medium transition back to the closed state due to the biasing forces.

Because each of the valves 122 is biased to a closed state when a print medium is not located above the respective valve 122, suction is automatically prevented through any holes 121 that happen to not be covered by a print medium. With suction through the uncovered holes 121 being prevented, the crossflows that would have been induced by such uncovered holes 121 are reduced or eliminated. Thus, image blur near the edges of the print media is reduced.

The vacuum plenum 125 comprises baffles, walls, or any other structures arranged to enclose or define an environment in which a vacuum state (e.g., low pressure state) is maintained by the vacuum source 128, with the plenum 125 fluidically coupling the vacuum source 128 to the movable support surface 120 such that the movable support surface 120 is exposed to the vacuum state within the vacuum plenum 125. In some embodiments, the movable support surface 120 is supported by a vacuum platen 126, which may be a top wall of the vacuum plenum 125. In such an embodiment, the movable support surface 120 is fluidically coupled to the vacuum in the plenum 125 via platen holes 127 through the vacuum platen 126. In some embodiments, the movable support surface 120 is itself one of the walls of the vacuum plenum 125 and thus is exposed directly to the vacuum in the plenum 125. The vacuum source 128 may be any device configured to remove air from the plenum 125 to create the low-pressure state in the plenum 125, such as a fan, a pump, etc.

As noted above, the media loading/registration device 155 loads the print media onto the movable support surface 120 and registers the print media relative to various registration datums, as those of ordinary skill in the art are familiar with. For example, as each print medium is loaded onto the movable support surface 120, and one edge of each print medium may be registered to (i.e., aligned with) a process-direction registration datum (such as the registration datums Reg in FIG. 1G) that extends in the process direction. Herein, whichever side of the media transport assembly 103 is closest to the process-direction registration datum is referred to as the outboard side of the media transport assembly 103 and the edge that is registered to this datum is referred to as the outboard edge, while the opposite side of the device is referred to as the inboard side and the opposite edge is referred to as the inboard edge. In practice, the registration datum could be located on either side of the media transport assembly 103, and thus the side of the media transport assembly 103 that is considered the outboard side will vary from system to system (or from time to time within the same system) depending on which side the print media happen to be registered to. In addition, the lead and/or trail edges of the print media may be registered to various cross-process datums along the movable support surface 120 as the print media are loaded thereon. Thus, by registering each print medium to the process-direction registration datum and one of the cross-process registration datums, a precise location and orientation of the print medium relative to the movable support surface 120 may be enforced, thus allowing for accurate printing of images on the print medium. Various media loading devices for loading print media onto a movable support surface and registering the print media relative to the movable support surface are known in the art and used in existing printing systems. Any existing media loading device, or any new media loading device, may be used as the media loading/registration device 155. Because the structure and function of such media registration devices are well known in the art, further detailed description of such systems is omitted.

The control system 130 comprises processing circuitry to control operations of the printing system 100. The processing circuitry may include one or more electronic circuits configured with logic for performing the various operations described herein. The electronic circuits may be configured with logic to perform the operations by virtue of including dedicated hardware configured to perform various operations, by virtue of including software instructions executable by the circuitry to perform various operations, or any combination thereof. In examples in which the logic comprises software instructions, the electronic circuits of the processing circuitry include a memory device that stores the software and a processor comprising one or more processing devices capable of executing the instructions, such as, for example, a processor, a processor core, a central processing unit (CPU), a controller, a microcontroller, a system-on-chip (SoC), a digital signal processor (DSP), a graphics processing unit (GPU), etc. In examples in which the logic of the processing circuitry comprises dedicated hardware, in addition to or in lieu of the processor, the dedicated hardware may include any electronic device that is configured to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. The processing circuitry may also include any combination of dedicated hardware and general-purpose processor with software.

Figure 3:
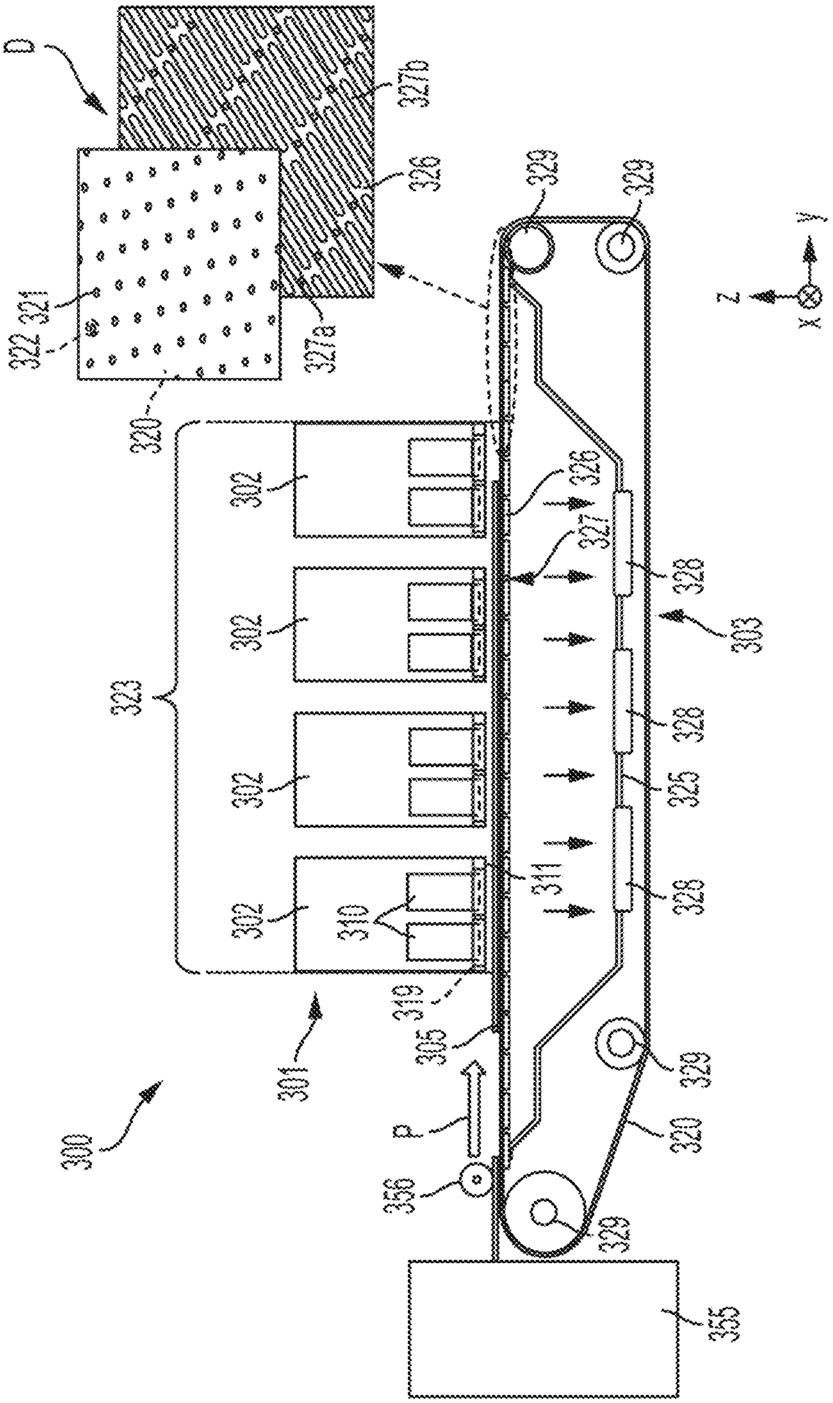
FIG. 3 is a schematic illustration of an ink deposition assembly and media transport assembly of one embodiment of an inkjet printing system.

Turning now to FIG. 3, an embodiment of a printing system 300 will be described, which may be used as the printing system 100 described above with reference to FIG. 2. FIG. 3 comprises a schematic illustrating a portion of the printing system 300 from a side view. As illustrated in FIG. 3, the printing system 300 comprises an ink deposition assembly 301 and a media transport assembly 303, which can be used as the ink deposition assembly 101 and media transport assembly 103, respectively. The printing system 300 may also comprise additional components not illustrated in FIG. 3, such as a control system (e.g., the control system 130).

In the printing system 300, the ink deposition assembly 301 comprises four printhead modules 302 as shown in FIG. 3, with each printhead module 302 having multiple printhead 310. The printhead modules 302 are arranged in series along a process direction P above the media transport assembly 303, such that the print media 305 is transported sequentially beneath each of the printhead modules 302. The printheads 310 are arranged to eject print fluid (e.g., ink) through respectively corresponding printhead openings 319 in a corresponding carrier plate 311. In an embodiment, each printhead module 302 has three printheads 310 and the printheads 310 are arranged in an offset pattern with two printheads 310 being aligned within one another in the cross-process direction and the third printhead 310 being offset upstream or downstream from the other two printheads 310 (only two printheads 310 per module 302 are visible in FIG. 3 because one of the printheads 310 is obscured by another printhead 310 in this view). In other embodiments, different numbers and/or arrangements of printheads 310 and/or printhead modules 302 are used.

In the printing system 300, media transport assembly 303 comprises a flexible belt providing the movable support surface 320. As shown in FIG. 3, the movable support surface 320 is driven by rollers 329 to move along a looped path, with a portion of the path passing through the ink deposition region 323 of the ink deposition assembly 301. In addition, a roller 356 is provided to press the print media against the movable support surface 320, which can facilitate adhering the print media 305 flatly to the movable support surface 320. Furthermore, in this embodiment, the vacuum plenum 325 comprises a vacuum platen 326, which forms a top wall of the plenum 325 and supports the movable support surface 320. The platen 326 comprises platen holes 327, which allow fluidic communication between the interior of the plenum 325 and the underside of the movable support surface 320.

The movable support surface 320 comprises a number of valves 322, which may be used as the valves 122 in the printing system 100 of FIG. 2. Each of the valves 322 comprises a hole 321 to fluidically couple the region below the movable support surface 320 to the region above the movable support surface and a closure mechanism to close and open the hole 321. The valves 322 and their respective holes 321 thus have an open state and a closed state. The holes 321 are arranged such that the outlet opening of each hole 321 (e.g., on a bottom side of the movable support surface 320, opposite from the side that supports the print media) is aligned in the process direction (y-axis) with a collection of corresponding platen holes 327. Thus, as the movable support surface 320 moves across the platen 326, each hole 321 will periodically move over a corresponding platen hole 327, resulting in the hole 321 and the platen hole 327 being temporarily vertically aligned (i.e., aligned in a z-axis direction). When a hole 321 is in the open state and moves over a corresponding platen hole 327, the holes 321 and platen holes 327 define an open passageway that fluidically couples the environment above the movable support surface 320 to the low-pressure state in the vacuum plenum 325, thus generating vacuum suction through the holes 321 and platen holes 327. This suction generates a vacuum hold down force on the print medium 305 disposed above the holes 321. When a hole 321 is in a closed state, the vacuum suction is prevented from being communicated through that hole 321, regardless of whether the hole 321 is aligned with a platen hole 327.

The valves 322 are configured to transition between open and closed states based on whether they are covered by a print medium, similarly to the valves 122 described above. The valves 322 are initialized to an open state (by an external force, described further below). After being initialized to the open state, the valves 322 automatically transition from the open state to the closed state if they are not covered by a print medium 305 due to biasing forces, as described further below. On the other hand, those valves 322 that are covered by a print medium are held in the open state by interaction with the print medium that overcomes the biasing forces.

More specifically, the valves 322 may comprise a closure mechanism (e.g., a flexible reed) which is movable between open and closed positions, with the position of the closure mechanism controlling whether the hole 321 of the valve 322 is an open state or a closed state. The closure mechanism is biased towards the closed position. The biasing forces that bias the closure mechanism to the closed position may include vacuum suction forces that are applied to the closure mechanism as a result of the closure mechanism being exposed the vacuum suction from the plenum 325. The biasing forces may also include internal structural forces (e.g., spring force) of the closure mechanism. When there is no print medium above a given valve 322, then there is no countervailing force to overcome the biasing forces, and therefore the closure mechanism is moved to the closed position. On the other hand, when a print medium is present above the given valve 322, the print medium interacts with (e.g., presses against) the closure mechanism and provides a countervailing force to overcome the biasing forces and hold the closure mechanism in the open position. The countervailing forces from the print medium may include the weight of the print medium 305 together with vacuum suction forces applied to the print medium 305 via the open hole 321.

In some embodiments, the initialization of a valve 322 to the open state may occur as a result of the weight of a print medium pressing against the closure mechanism as the print medium is loaded onto the movable support surface 320. In such embodiments, only those valves 322 that happen to be located under a print medium are initialized to the open state, while other valves may remain in the closed state.

However, in some embodiments, the weight of a print medium 305 alone may be insufficient to overcome the biasing forces to move the closure mechanism to the open position. Thus, in some embodiments, the roller 356 (see FIG. 3) is used to provide additional external force to help initialize the valves to the open position. As the movable support surface 320 (and any print media being loaded thereon) pass under the roller 356, the roller 356 presses against the movable support surface 320 (directly or via a print medium, if present) and thereby applies force to the closure mechanisms of the valves 322. The forces generated by the roller 356 pressing against the closure mechanisms are sufficient to overcome the biasing forces, and thus the closure mechanisms are moved to the open position as the valves pass the roller 356. Once a given valve 322 is initialized to the open position, it will either remain in the open position or transition to the closed position, based on whether a print medium 305 is present above the hole 321, as described above. Valves 322 that are located under a print medium remain in the open state even after the pressing force from the roller 356 is no longer present, despite the weight of the print medium being insufficient to overcome the biasing forces, because once the hole 321 has been initially opened by the roller 356 the vacuum suction from the vacuum plenum can now be communicated through the open hole 321 to the print medium above the valve 321, and the vacuum suction interacts with the print media to generate a suction force that pull the print media against the movable support surface. This suction force on the print media is sufficient (in combination with the weight of the print media) to overcome the biasing forces and hold the valve in the open position. Thus immediately after passing the roller 356 all valves 322 are open, but shortly thereafter all holes 321 that are covered by a print medium remain in the open state while all holes 321 not covered by a print medium transition to the closed state 321.

Because the valves 322 automatically move to the closed state in the absence of a print medium 305 covering the holes 321 associated with the valve 322, the crossflows that would otherwise be induced through those holes 321 are prevented. Thus, image blur near the edges of the print media 305 is reduced or prevented. In addition, because the holes 321 covered by print media 305 are in an open state, the vacuum suction can be communicated through those holes 321 hold down force the print media 305.

In some embodiments, the platen holes 327 may include (of be coupled to) channels on a top side thereof, as seen in the expanded cutaway of FIG. 3, which may increase an area of the opening of the platen holes 327 on the top side thereof. Specifically, the platen holes 327 may include a through hole portion 327*a* which opens to a bottom side of the platen 326 and a channel potion 327*b* which opens to a top side of the platen 326, with the channel portion 327*b* being elongated in the process direction. In some embodiments, multiple through hole-portions portions 327*a* may be coupled to the same channel portion 327*b*.

The media transport assembly 303 also comprises a media loading/registration device 355, which loads print media 305 onto the movable support surface 320 and registers the print media 305 relative to the movable support surface 320. The media loading/registration device 355 is similar to and may be used as the media loading/registration device 155 described above. In some embodiments, the roller 356 may be part of the media loading/registration device 355.

Figure 4:
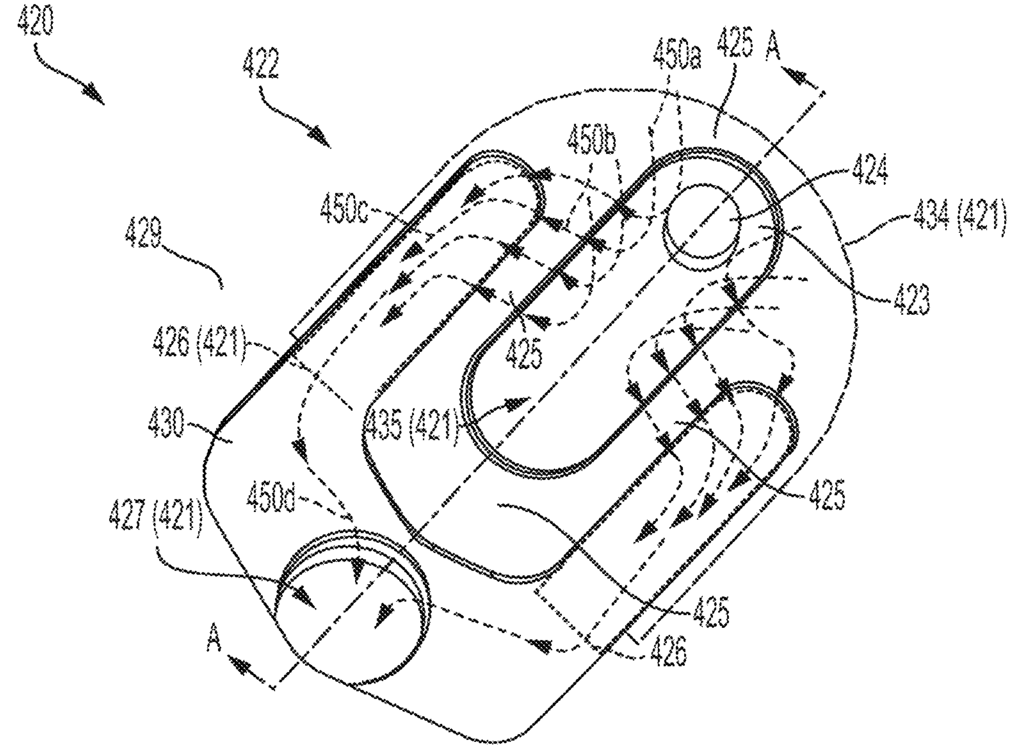
FIG. 4 is a plan view from above of an embodiment of a movable support surface with a valve.
Figure 5A:
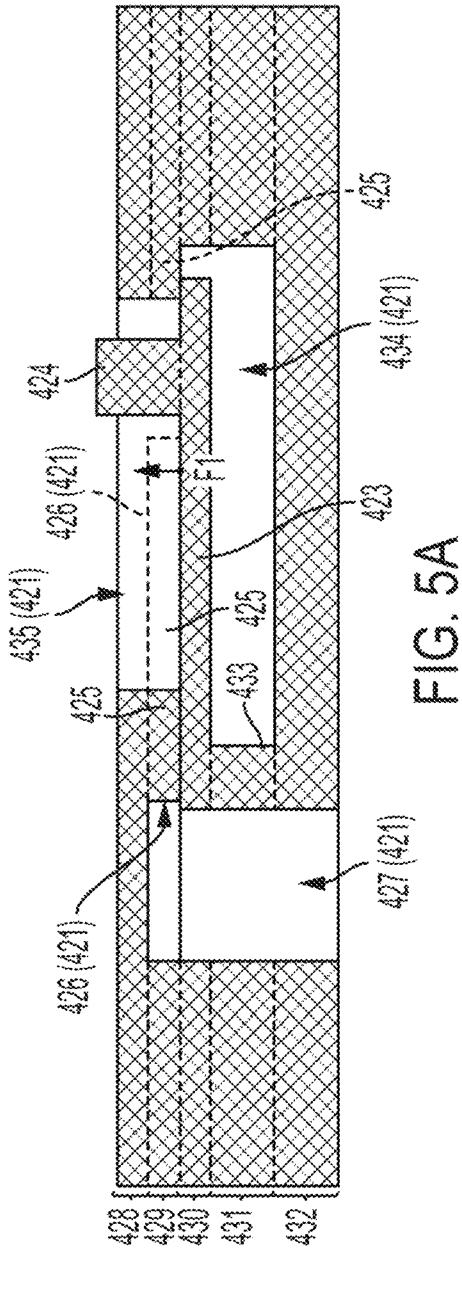
FIGS. 5A-5B are cross-sectional views of the movable support surface of FIG. 4, with the cross-section taken along A in FIG. 4.
Figure 5B:
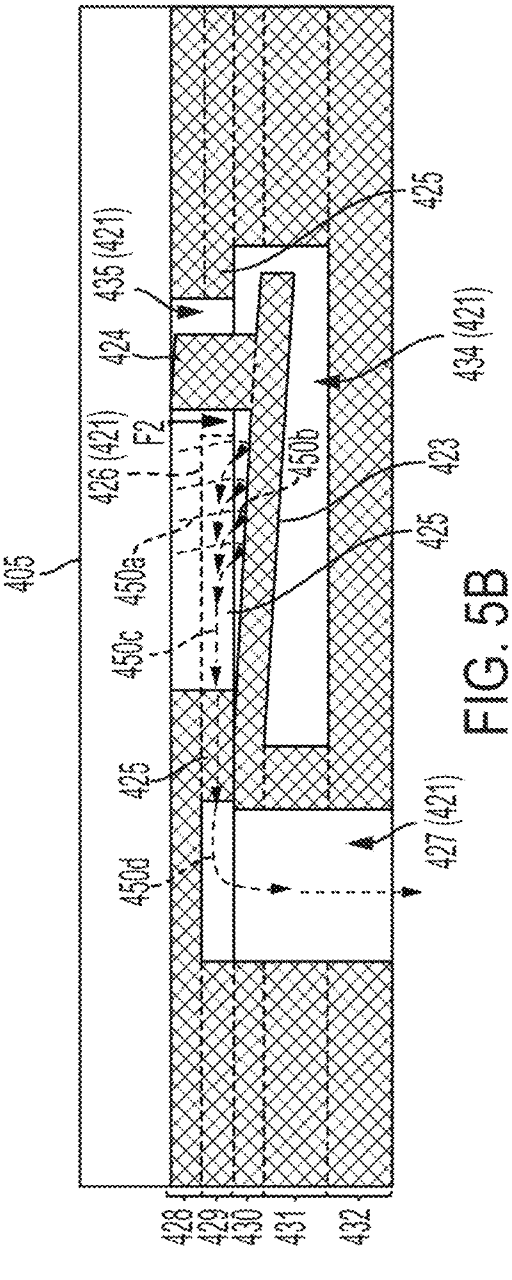

FIGS. 4-5B illustrate an embodiment of a valve that can be used in a movable support surface in accordance with various embodiments of the present disclosure. FIG. 4 is a detailed perspective view of a valve 422 from above the valve 422. FIGS. 5A and 5B comprise cross-sections taken along the line A in FIG. 4, with FIG. 5A illustrating the valve 422 in a closed state and FIG. 5B illustrating the valve 422 in an open state. In some embodiments, such as in FIG. 4, the valve 422 is formed within a movable support surface 420, and portions of the valve 442 are formed by the material of the movable support surface 420. In other embodiments (not illustrated), the valve 442 may be formed as a separate structure that can be joined to the movable support surface 420. In FIGS. 4-5B and the description below, various layers 428 to 432 are illustrated and described as separate layers to facilitate understanding. However, in practice the layers 428 to 432 may not be distinguishable from one another in a finished product due to being joined together or manufactured together as an integral whole. In other words, in some embodiments the valve 422 is formed from separately identifiable layers, which may include layers 428 to 432, but in other embodiments the valve 422 may formed in a material without identifiable layers, in which case the layers 428 to 432 as described herein should be understood as referring to different portions (e.g., depths) of the material. In some embodiments the layers 428 to 432 are also part of the movable support surface 420. For convenience, it is assumed in portions of the description below that the layers 428 to 432 are part of the movable support surface 420, but this is not limiting. In FIG. 4, a top layer 428 of the valve 422 (which may also be a top layer of the movable support surface 420 in some embodiments) is made transparent to allow visibility of other parts.

As shown in FIGS. 4-5B, the valve 422 comprises a hole 421 that forms a passageway through the valve 422 and through the movable support surface 420 in which the valve 422 is disposed. The hole 421 comprises a top hole portion 435 which defines a passageway that opens to a top side of the movable support surface 420 (the side which faces the print media) and a bottom hole portion 427, offset from the top hole portion 435, which defines a passageway that opens to a bottom side of the movable support surface 420 (the side which faces the vacuum platen/vacuum plenum). The top hole portion 435 may be formed in the layers 428 and 429, while the bottom hole portion 427 is formed in the layers 430 to 432. The hole also comprises a chamber 434 formed in the layers 430 and 431, with the top hole portion 435 being fluidically coupled to the chamber 434 (assuming the reed 423, described in greater detail below, is in an open position). The hole 421 also comprises one or more channels 426 are formed in layer 429, which are fluidically coupled to the bottom hole portion 427 at one end and fluidically coupled to the chamber 434 at another end (again, assuming the reed 423 is in the open position). Thus, the top hole portion 435 is fluidically coupled to the bottom hole portion 427 via the chamber 434 and the channels 426 (again, assuming the reed 423 is in the open position), and therefore the hole 421 can fluidically couple the region below the valve 422 to the region above the valve 422.

As noted above, in FIG. 4 the top layer 428 is omitted/made transparent to reveal the features below the top layer 428. The top layer 428 covers each of the parts illustrated in FIG. 4 except in the region corresponding to the top hole portion 435, wherein the top layer 428 has an aperture which forms part of the top hole portion 435. In FIG. 4, the bottom hole portion 427 is offset from the top hole portion 435 in the process direction (y-direction) and therefore the channels 426 extend in the process direction, but this is a non-limiting example and in other embodiments the valve 422 and/or hole 421 could be oriented in any manner.

As mentioned above, the valve 422 also comprises a flexible reed 423, which is positioned in the chamber 434 under the top hole portion 435. The reed 423 forms a closure mechanism of the valve 422 and is movable between a closed position (see FIG. 5A) and an open position (see FIG. 5B). In the closed position, the reed 423 is positioned at a boundary between the top hole portion 435 and the chamber 434, and thus the reed 423 blocks airflow between chamber 434 and the top hole portion 435. In addition, in the closed position the reed 423 is positioned at a boundary between the chamber 434 and the channels 426, and thus the reed 423 blocks airflow between the chamber 434 and the channels 426. Thus, in the closed position of the reed 423, the hole 421 is closed and airflow is prevented between the top hole portion 435 and the bottom hole portion 427. In the open position (see FIGS. 4 and 5B), the reed 423 allows airflow between the top hole portion 435 and the chamber 434 and between the chamber 434 and the channels 426. Thus, in the open position of the reed 423, the hole 421 is open and airflow is allowed between the top hole portion 435 and the bottom hole portion 427. The airflow is depicted by the dot-lined arrows in the figures, with some portions of the airflow being labeled 450*a* through 450*d*, which are discussed further below.

The reed 423 can be formed out of the material of the movable support surface 420 itself, such as out of the flexible belt material in various embodiments, or alternatively can be a separate structure. A proximal end of the reed 423 is connected to the remainder of the valve 422, while a distal end of the reed 423 is a free end able to move relative to the remainder of the valve 422 in a vertical direction (i.e., along a thickness dimension of the movable support surface 420). Thus, the reed 423 is configured as a cantilever such that a downward force applied to the distal end of the reed 423 causes the reed 423 to elastically flex/bend. In the closed position (see FIG. 5A), the reed 423 is relatively unbent and approximately parallel to the third layer 430 top and bottom side of the movable support surface 420. In the open position (see FIG. 5B), the reed 423 is bent with the distal end thereof being moved downward toward the bottom side of the movable support surface 420. The reed 423 comprises a protrusion 424 at a distal end portion of the reed 423. The protrusion 424 extends vertically from the remainder of the reed 423 such that, when the reed 435 is in the closed position, the protrusion 424 extends out of the top hole portion 435 with a top of the protrusion 424 being located above the top of the layer 428 (i.e., above a top of the movable support surface 420). Thus, when a print medium 405 is present above the valve 422 (see FIG. 5B), the protrusion 424 is contacted by the bottom face of the print medium 405. If the print medium 405 is forced flat against the top surface 428 (i.e., the top surface of the movable support surface 420), e.g., by a roller or by vacuum suction, then the force exerted by the print medium 405 on the protrusion 424 pushes the protrusion 424 downward and moves the reed 423 to the open position. If a print medium is absent (see FIG. 4A), then the reed 423 can return to the closed position. In some embodiments, the reed 423 is formed integrally and out of the material of the layer 430 (e.g., out of the material of the movable support surface 420), for example by cutting or otherwise removing or omitting material to form the reed 423. In other embodiments, the reed 423 is a separate structure joined to the rest of the valve 422.

As noted above, one or more channels 426 are formed in the layer 429. As shown in FIGS. 4-5B, the channels 426 are formed as open spaces which are omitted or removed from the layer 429. The channels 426 are bounded on a top side by the layer 428 and on lateral sides by portions of the layer 429. In particular, the channels 426 are separated in a lateral direction from the top hole portion 435 by a barrier 425, which surrounds the top hole portion 435 in the second layer 429. In FIG. 4, two channels 426 are provided running along opposite sides of the top hole portion 435, and lateral portions of the barrier 425 separating the channels 426 from the top hole portion 435. A bottom of the channels 426 is bounded by the reed 423 and/or the rest of the third layer 430.

When the reed 423 is in the closed position (FIG. 5A), the top face of the reed 423 is in contact with, or very near to, the layer 429 (including the barrier 425). Thus, in the closed position of the reed 423, the reed 423 and the layer 429 (including the barrier 425) cooperate to block off the channels 426 from the chamber 434 to prevent airflow therebetween. Thus, in the closed position of the reed 423, airflow is blocked between the bottom hole portion 427 and the top hole portion 435, and therefore the vacuum suction from the vacuum plenum is not communicated to the top hole portion 435. However, in the closed position of the reed 423, the vacuum suction from the vacuum plenum is communicated to the channels 426, and therefore a relatively low-pressure state is established in the channels 426. This relatively low-pressure state in the channels 426 results in a vacuum suction force F1 being applied to the reed 423 which pulls the reed 423 upward. The force F1 is represented by a solid arrow in FIG. 5A. Thus, in the closed state, the vacuum suction from the vacuum plenum generates forces that hold the reed 423 in the closed position.

When the reed 423 is in the open position (FIGS. 4 and 5B), the top face of the reed 423 is spaced apart from the bottom of the barrier 425 such that air can flow between the chamber 423 and the channels 426 by passing under the barrier 425 (via the gap between the bottom of the barrier 425 and the top of the reed 423). Hypothetical airflow is indicated in FIGS. 4 and 5B by dot-lined arrows. For example, air enters the hole 421 via the top hole portion 435, as indicated in FIGS. 4 and 5B by airflow 450*a*, and then the air then passes under the barrier 425 into the channels 426 as indicated by airflow 450*b*. The air then flows through the channels 426, as indicated by airflow 450*c*, and into the bottom hole portion 427, as indicated by airflow 405*d*, from whence the air exits the hole 421. Thus, when the reed 423 is in the open position, the vacuum suction from below the movable support surface 420 is allowed to be communicated through the hole 421 to the top side of the movable support surface 420, via the bottom hole portion 427, the channels 426, the chamber 434, and the top hole portion 435. As shown in FIGS. 5B, when a print medium 405 is above the hole 421, the vacuum suction communicated through the hole 421 to the bottom side of the print medium 405 creates a relatively low pressure state below the print medium 405, which results in a vacuum suction force F2 being applied to the print medium which pulls the print medium 405 downward. The force F2 is represented by a solid arrow in FIG. 5B. This vacuum suction force F2 tends to pull the print medium 405 downward, resulting in the print medium 405 pressing downward against the protrusion 424 of the reed 423. The upward spring force of the reed 423 and the upward vacuum suction force F1 being applied to the reed 423 tend to resist downward movement of the reed 423, but the downward vacuum suction force F2 is sufficiently large to overcome this resistance. The downward vacuum suction force F2 applied to the print medium 405 may sufficiently large to overcome the upward vacuum suction force F1 applied to the reed 423 due to the geometry of the hole 421. For example, a greater surface area of the print media 405 may be exposed to the vacuum suction, generating a larger suction force. Moreover, the position at which the force F2 is applied to the reed 423 (i.e., at protrusion 424) may be more distal than the positions at which the force F1 is applied, resulting in greater leverage (mechanical advantage) for the force F2 being applied to the reed 423. Thus, the downward vacuum suction force F2 applied to the print medium 405 overcomes the resistance of the upward suction force and the spring tension of the reed 423, resulting in the print medium 405 being pulled flush against the top of the movable support surface 420 and the reed 423 being pushed down into the open position. The reed 423 will remain in this open position as long as the vacuum suction continues to be applied to the print medium 405. However, if the print medium 405 is removed, then the upward vacuum suction force F1 and the spring tension of the reed 423 will then move the reed 423 back to the closed position.

The valve 422 may be similar in some ways to a reed valve, which utilizes a flexible reed positioned over an aperture to allow airflow through the aperture in one direction while preventing airflow through the aperture in an opposite direction. However, the valve 422 may differ from a reed valve in various ways. For example, the valve 422 is not necessarily intended to allow airflow in one direction while preventing it in the other direction, since in operation the airflow through the valve 422 is already constrained to move in just one direction due to the vacuum suction. Moreover, in a reed valve the reed is generally actuated as a result changes in which side of the reed is exposed to higher pressure and which is exposed to lower pressure (as a result of changes in direction of airflow), i.e., when lower pressure is located on a first side of the reed the reed is open, but when the lower pressure is located on the second side of the reed the reed is closed. In contrast, in the valve 422 the low pressure is located on the same side of the reed 423 both in the closed state and in the open state (assuming the vacuum suction is on). Thus, the valve 422 is not actuated from closed to open as a result of a change in which side of the reed 423 is exposed the lower pressure, but rather the valve 422 is actuated from the closed state to the open state as a result of application of an external force to the reed 423 (e.g., from the print media and/or roller).

As noted above, in some embodiments the valve 422 is an integral part of the movable support surface 420 that is formed, at least in part, from the material of the movable support surface 420. In some of these embodiments, the movable support surface 420 comprises a flexible belt with multiple layers 428 to 432 stacked together and with the valves 522 formed within the layers 428 to 432. The layers are indicated by dot-dashed lines in FIGS. 5A and 5B. In some embodiments, the layers 428 to 432 are separately formed and then later joined together, for example by adhesives, fusion (e.g., melting), sewing, or by any other joining technique. In some embodiments, the layers 428 to 432 are formed together as an integral whole, for example via additive manufacturing (e.g., 3D-printing). In some embodiments, some or all of the layers 428 to 432 are formed from a different material than other layers 428 to 432. In some embodiments, some or all of the layers 428 to 432 are formed from the same material as one another. In some embodiments, the movable support surface 420 may be approximately 0.35 mm thick, with each of the layers 428 to 432 being less than 0.1 mm thick. In some embodiments, the reed 423 and chamber 434 may be approximately 0.8 mm long, which length may allow for the movable support surface 420 to bend around rollers used in a media transport assembly without damaging the reed 423 or causing other failures. Although the layers 428 to 432 are illustrated and described herein as separate layers to facilitate understanding, in practice the layers 428 to 432 may not be distinguishable from one another in a finished product due to being joined together or manufactured together as an integral whole. The above descriptions of examples of suitable materials and dimensions of valve 422 and layers are also applicable to other embodiments in which the valve 422 is formed as distinct structure from the movable support surface 420, which is (or can be) joined to the movable support surface 420.

Although specific shapes and relative sizes are illustrated for various parts of the valves 422, these shapes and relative sizes are not limiting. For example, the top and bottom hole portions 435 and 427 could be larger or smaller, have different aspect ratios (i.e., be more oblong or less oblong), have different shapes (e.g., square, polygonal, etc.). As another example, the reed 423 could be longer, shorter, wider, narrower, or differently shaped (e.g., rectangular, etc.). Furthermore, although two channels 42 are illustrated, in other embodiments, fewer or more channels 426 could be provided to couple the chamber 434 to the bottom hole portion 427.

In the embodiments described above with respect to FIGS. 4-5B, the valve 422 is formed directly within, and is an integral part of, the movable support surface 420. In other words, at least some of the parts of the self-closing hole 421 are formed by the same body that constitutes movable support surface 420 itself—for example, the material of the movable support surface 420 may form the barrier 425 and define the boundaries of the top hole portion 435, the bottom hole portion 427, and the channels 426. Moreover, in some embodiments, the reed 423 may also be formed out of the material of the movable support surface 420, as described above. However, it should be understood that the same valve 423 could be manufactured in a body that is separate from the movable support surface 420, and then that body could be joined to the movable support surface 420 later. In such an embodiment, the same structure as illustrated in FIGS. 4-5B is used, but the material layers referred to above as being layers of the movable support surface 420 would instead be material layers of the body in which the valve 422 is formed. The body comprising the valve 422 could be inserted into the movable support surface 420 (e.g., via a hole in the movable support surface 452) and attached to the movable support surface via adhesive, fusion, press fitting, friction fitting, etc. In some embodiments, the body comprising the valve 422 is configured similar to a rivet to have a portion that changes shape after being insertion through the movable support surface 420 (e.g., via bending, deforming, expanding, etc.) to secure the body to the movable support surface 420.

This description and the accompanying drawings that illustrate inventive aspects and embodiments should not be taken as limiting—the claims define the protected invention. Various mechanical, compositional, structural, electrical, and operational changes may be made without departing from the spirit and scope of this description and the claims. In some instances, well-known circuits, structures, and techniques have not been shown or described in detail in order not to obscure the invention. Like numbers in two or more figures represent the same or similar elements.

Further, the terminology used herein to describe aspects of the invention, such as spatial and relational terms, is chosen to aid the reader in understanding embodiments of the invention but is not intended to limit the invention. For example, spatially terms—such as "beneath", "below", "lower", "above", "upper", "inboard", "outboard", "up", "down", and the like—may be used herein to describe directions or one element's or feature's spatial relationship to another element or feature as illustrated in the figures. These spatial terms are used relative to the poses illustrated in the figures, and are not limited to a particular reference frame in the real world. Thus, for example, the direction "up" in the figures does not necessarily have to correspond to an "up" in a world reference frame (e.g., away from the Earth's surface). Furthermore, if a different reference frame is considered than the one illustrated in the figures, then the spatial terms used herein may need to be interpreted differently in that different reference frame. For example, the direction referred to as "up" in relation to one of the figures may correspond to a direction that is called "down" in relation to a different reference frame that is rotated 180 degrees from the figure's reference frame. As another example, if a device is turned over 180 degrees in a world reference frame as compared to how it was illustrated in the figures, then an item described herein as being "above" or "over" a second item in relation to the Figures would be "below" or "beneath" the second item in relation to the world reference frame. Thus, the same spatial relationship or direction can be described using different spatial terms depending on which reference frame is being considered. Moreover, the poses of items illustrated in the figure are chosen for convenience of illustration and description, but in an implementation in practice the items may be posed differently.

The term "process direction" refers to a direction that is parallel to and pointed in the same direction as an axis along which the print media moves as is transported through the deposition region of the ink deposition assembly. Thus, the process direction is a direction parallel to the y-axis in the Figures and pointing in a positive y-axis direction.

The term "cross-process direction" refers to a direction perpendicular to the process direction and parallel to the movable support surface. At any given point, there are two cross-process directions pointing in opposite directions, i.e., an "inboard" cross-process direction and an "outboard" cross-process direction. Thus, considering the reference frames illustrated in the Figures, a cross-process direction is any direction parallel to the x-axis, including directions pointing in a positive or negative direction along the x-axis. References herein to a "cross-process direction" should be understood as referring generally to any of the cross-process directions, rather than to one specific cross-process direction, unless indicated otherwise by the context. Thus, for example, the statement "the valve is movable in a cross-process direction" means that the valve can move in an inboard direction, outboard direction, or both directions.

The terms "upstream" and "downstream" may refer to directions parallel to a process direction, with "downstream" referring to a direction pointing in the same direction as the process direction (i.e., the direction the print media are transported through the ink deposition assembly) and "upstream" referring to a direction pointing opposite the process direction. In the Figures, "upstream" corresponds to a negative y-axis direction, while "downstream" corresponds to a positive y-axis direction. The terms "upstream" and "downstream" may also be used to refer to a relative location of element, with an "upstream" element being displaced in an upstream direction relative to a reference point and a "downstream" element being displaced in a downstream direction relative to a reference point. In other words, an "upstream" element is closer to the beginning of the path the print media takes as it is transported through the ink deposition assembly (e.g., the location where the print media joins the movable support surface) than is some other reference element. Conversely, a "downstream" element is closer to the end of the path (e.g., the location where the print media leaves the support surface) than is some other reference element. The reference point of the other element to which the "upstream" or "downstream" element is compared may be explicitly stated (e.g., "an upstream side of a printhead"), or it may be inferred from the context.

The terms "inboard" and "outboard" refer to cross-process directions, with "inboard" referring to one to cross-process direction and "outboard" referring to a cross-process direction opposite to "inboard." In the Figures, "inboard" corresponds to a positive x-axis direction, while "outboard"

corresponds to a negative x-axis direction. The terms “inboard” and “outboard” also refer to relative locations, with an “inboard” element being displaced in an inboard direction relative to a reference point and with an “outboard” element being displaced in an outboard direction relative to a reference point. The reference point may be explicitly stated (e.g., “an inboard side of a printhead”), or it may be inferred from the context.

The term “vertical” refers to a direction perpendicular to the movable support surface in the deposition region. At any given point, there are two vertical directions pointing in opposite directions, i.e., an “upward” direction and an “downward” direction. Thus, considering the reference frames illustrated in the Figures, a vertical direction is any direction parallel to the z-axis, including directions pointing in a positive z-axis direction (“up”) or negative z-axis direction (“down”).

The term “horizontal” refers to a direction parallel to the movable support surface in the deposition region (or tangent to the movable support surface in the deposition region, if the movable support surface is not flat in the deposition region). Horizontal directions include the process direction and cross-process directions.

The term “vacuum” has various meanings in various contexts, ranging from a strict meaning of a space devoid of all matter to a more generic meaning of a relatively low pressure state. Herein, the term “vacuum” is used in the generic sense, and should be understood as referring broadly to a state or environment in which the air pressure is lower than that of some reference pressure, such as ambient or atmospheric pressure. The amount by which the pressure of the vacuum environment should be lower than that of the reference pressure to be considered a “vacuum” is not limited and may be a small amount or a large amount. Thus, “vacuum” as used herein may include, but is not limited to, states that might be considered a “vacuum” under stricter senses of the term.

The term “air” has various meanings in various contexts, ranging from a strict meaning of the atmosphere of the Earth (or a mixture of gases whose composition is similar to that of the atmosphere of the Earth), to a more generic meaning of any gas or mixture of gases. Herein, the term “air” is used in the generic sense, and should be understood as referring broadly to any gas or mixture of gases. This may include, but is not limited to, the atmosphere of the Earth, an inert gas such as one of the Noble gases (e.g., Helium, Neon, Argon, etc.), Nitrogen ($N_2$) gas, or any other desired gas or mixture of gases.

In addition, the singular forms “a”, “an”, and “the” are intended to include the plural forms as well, unless the context indicates otherwise. And, the terms “comprises”, “comprising”, “includes”, and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the inventions disclosed herein. It is intended that the specification and embodiments be considered as exemplary only, with the following claims being entitled to their fullest breadth, including equivalents, under the applicable law.

What is claimed is:

1. A printing system, comprising:

an ink deposition assembly comprising a printhead arranged to eject a print fluid to a deposition region of the ink deposition assembly; and a media transport assembly comprising a vacuum source and a movable support surface, the movable support surface comprising valves having holes through the movable support surface, and the media transport assembly configured to hold one or more print media against the movable support surface by vacuum suction communicated from the vacuum source through valves, wherein the valves are each configured to transition between a closed state in which airflow through the hole of the respective valve is prevented and an open state in which airflow through the hole of the respective valve is allowed, wherein the valves are configured such that, for each of the valves:

on condition of none of the print media covering the respective valve, the respective valve is held in the closed state; and on condition of the respective valve being covered by a print medium of the print media, the respective valve is held in the open state by force applied by the print medium to the respective valve via contact between the print medium and the respective valve with the force applied by the print medium to the respective valve being generated by a weight of the print medium and by a suction force applied to the print medium by the vacuum suction from the vacuum source.

2. The printing system of claim 1, wherein the valves are biased toward the closed state.

3. The printing system of claim 2, wherein each of the valves is biased toward the closed state by a biasing force comprising a combination of an internal spring force and a suction force applied to the respective valve from the vacuum suction, with both the spring force and the suction force urging the valve toward the closed state; and wherein each of the valves is configured such that, on condition of a print medium of the print media covering the respective valve, the biasing force is overcome by the force applied by the print medium to the respective valve.

4. The printing system of claim 3, wherein each of the valves is configured such that the biasing force causes the valve to move to and/or stay in the closed state on condition of none of the print media covering the respective valve.

5. The printing system of claim 1, wherein each of the valves comprises a flexible reed configured as a cantilever coupled to the movable support surface and moveable via bending between an open position in which the flexible reed allows airflow through the hole of the respective valve and a closed position in which the flexible reed blocks airflow through the hole of the respective valve, the open position of the flexible reed corresponding to the open state of the respective valve and the closed position of the flexible reed corresponding to the closed state of the respective valve.

6. The printing system of claim 5, wherein each of the valves is biased toward the closed state by an internal spring force generated by the flexible reed of the respective valve and by a suction force applied to the flexible reed of the respective valve from the vacuum suction, with both the spring force and the suction force urging the flexible reed of the respective valve toward the closed position;

wherein each of the valves is configured such that the vacuum suction from the vacuum source is routed through the hole of the respective valve to generate the suction force on the flexible reed.

7. The printing system of claim 6, wherein each of the valves is configured such that, on condition of the respective valve being in the open state and none of the print media covering the respective valve, the biasing force moves the flexible reed to the closed position to transition the respective valve to the closed state.

8. The printing system of claim 6, wherein each of the valves is configured such that, on condition of the respective valve being in the open state and covered by a print medium of the print media, the force applied by the print medium to the respective valve is sufficient to overcome the biasing force and hold the flexible reed in the open position.

9. The printing system of claim 1, wherein the media transport assembly further comprises a roller arranged to engage the valves as the valves move past the roller, wherein engagement of the roller with one of the valves transitions the valve to the open state.

10. The printing system of claim 1, wherein the media transport assembly comprises a vacuum platen supporting the movable support surface, the vacuum platen comprising platen holes that communicate the vacuum suction to the movable support surface; and wherein the movable support surface comprises a belt configured to move over a surface of the vacuum platen.

11. The printing system of claim 1, wherein the media transport assembly further comprises a roller arranged to transition each of the valves to an open state by engaging each the valves as the valves move past the roller, wherein each of the valves is configured to, after being placed in the open state:

on condition of the respective valve being covered by a print medium of the print media, remain in the open state due to the force applied by the print medium to the respective valve; or on condition of none of the print media covering the respective valve, transition to the closed state due to a biasing force applied to the respective valve.

12. The printing system of claim 1, wherein for each of the valves, the respective valve is configured to, in a state of a print medium of the print media covering the respective valve, be passively actuated from the closed state to the open state by the print medium contacting and applying force to a movable portion of the respective valve.

13. A movable support surface for a printing system, comprising:

a flexible belt; and a plurality of valves arranged in the flexible belt to communicate vacuum suction through the flexible belt to hold print media being transported by the movable support surface against the flexible belt, wherein the valves are configured to transition between an open state in which the vacuum suction is communicated through the respective valve and a closed state in which the vacuum suction is blocked through the respective valve, and wherein each of the valves comprises a hole and a flexible reed configured as a cantilever coupled to the flexible belt and moveable via bending between an open position in which the flexible reed allows airflow through the hole of the respective valve and a closed position in which the flexible reed blocks airflow through the hole of the respective valve, the open position of the flexible reed corresponding to the open state of the valve and the closed position of the flexible reed corresponding to the closed state of the valve.

14. The movable support surface of claim 13, wherein each of the valves is configured to bias the flexible reed to the closed position at least in part via a spring force generated by the flexible reed.

15. The movable support surface of claim 13, wherein the flexible reed comprises a protrusion configured to extend above a top surface of the movable support surface when the flexible reed is in the closed position.

16. The movable support surface of claim 15, wherein for each of the valves, the flexible reed of the respective valve is configured to, in a state of a print medium of the print media covering the respective valve, be passively actuated from the closed position to the open position by the print medium contacting and applying force to the protrusion of the flexible reed of the respective valve.

17. The movable support surface of claim 13, wherein each of the valves is configured such that, on condition of vacuum suction being supplied to a region below the valve, the vacuum suction generates a biasing force on the flexible reed that urges the flexible reed to the closed position.

18. A method, comprising:

loading a print medium onto a movable support surface of a media transport assembly of a printing system;

holding the print medium against the movable support surface via vacuum suction from a vacuum source communicated through valves in the movable support surface;

causing those of the valves that are covered by the print medium to transition, by an opening force applied by the print medium to the valves, from a closed state in which the vacuum suction is blocked through the respective valves to an open state in which the vacuum suction is permitted through the respective valves;

causing those of the valves that are covered by the print medium and have been transitioned to the open state to remain in the open state by a holding force applied by the print medium to the valves, the holding force being generated by a weight of the print medium and by a suction force applied to the print medium by the vacuum suction from the vacuum source;

transporting the print medium, via the movable support surface, in a process direction through a deposition region of a printhead of the printing system; and ejecting print fluid from the printhead to deposit the print fluid to the print medium in the deposition region.

19. The method of claim 18, wherein causing those of the valves that are covered by the print medium to transition from the closed state to the open state comprises generating the opening force by pressing the print medium against the valves by a roller.

20. The method of claim 19, further comprising:

causing those of the valves that are not covered by the print medium to transition from the closed state to the open state via interaction of a roller with the valves; and causing those of the valves that are not covered by the print medium to, after the interaction with the roller, transition from the open state to the closed state by a biasing force.

* * * * *